(12) United States Patent
Tateishi

(10) Patent No.: US 10,890,453 B2
(45) Date of Patent: Jan. 12, 2021

(54) VEHICLE LOCALIZATION DEVICE

(71) Applicant: TOYOTA JIDOSHA KABUSHIKI KAISHA, Toyota (JP)

(72) Inventor: Kojiro Tateishi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 304 days.

(21) Appl. No.: 16/149,178

(22) Filed: Oct. 2, 2018

(65) Prior Publication Data

US 2019/0137281 A1 May 9, 2019

(30) Foreign Application Priority Data

Nov. 6, 2017 (JP) ................. 2017-213789

(51) Int. Cl.
*G01C 21/30* (2006.01)
*G01S 5/16* (2006.01)
(Continued)

(52) U.S. Cl.
CPC .............. *G01C 21/30* (2013.01); *G01C 21/28* (2013.01); *G01S 5/02* (2013.01); *G01S 5/16* (2013.01);
(Continued)

(58) Field of Classification Search
CPC .. B60W 40/072; B60W 50/045; B60W 30/10; B60W 40/105; B60W 50/14; B60W 30/16; G01C 21/3453; G01C 21/30; G01C 21/28; G01C 21/3407; G01C 21/32; G01C 21/34; G01C 21/3484; G01C 21/3492; G01C 21/367; G01S 17/89; G01S 2013/932; G01S 5/02; G01S 5/16; G01S 19/48; G01S 19/49; G01S 2013/9323; G01S 13/931; G01S 19/13; G01S 13/865; G01S 13/89; G01S 13/867; G06T 7/73; G06T 2207/10012; G06T 2207/30244; G06T 2207/30248; G06T 7/50; G06T 7/521;
(Continued)

(56) References Cited

U.S. PATENT DOCUMENTS 7,898,437 B2 3/2011 Okada et al.
2016/0339919 A1* 11/2016 Habu ................ B60W 30/0956
(Continued)

FOREIGN PATENT DOCUMENTS

EP 2 019 288 A1 1/2009
EP 2 878 975 A1 6/2015
(Continued)

*Primary Examiner* — Behrang Badii
(74) *Attorney, Agent, or Firm* — Sughrue Mion, PLLC

(57) ABSTRACT

A vehicle localization device includes: a target database; a target recognition unit configured to recognize, based on a detection result of an in-vehicle sensor, a relative position of the first target relative to a vehicle and a relative position of the second target relative to the vehicle; a lateral position estimation unit configured to estimate a lateral position of the vehicle and a direction of the vehicle based on the relative position of the first target relative to the vehicle and the position information on the first target on the map; and a longitudinal position estimation unit configured to estimate a longitudinal position of the vehicle by reflecting the lateral position of the vehicle and the direction of the vehicle.

6 Claims, 6 Drawing Sheets

(51) Int. Cl.
*G06T 7/73* (2017.01)
*G01S 5/02* (2010.01)
*G01C 21/28* (2006.01)
*G01S 19/48* (2010.01)
*G01S 19/49* (2010.01)
*G06F 16/9537* (2019.01)
*G06F 16/29* (2019.01)
*G01S 13/931* (2020.01)
*G01S 19/13* (2010.01)

(52) U.S. Cl.
CPC .............. *G01S 19/48* (2013.01); *G01S 19/49* (2013.01); *G06F 16/29* (2019.01); *G06F 16/9537* (2019.01); *G06T 7/73* (2017.01); *G01S 13/931* (2013.01); *G01S 19/13* (2013.01); *G01S 2013/932* (2020.01); *G01S 2013/9323* (2020.01); *G06T 2207/10012* (2013.01); *G06T 2207/30244* (2013.01); *G06T 2207/30248* (2013.01)

(58) Field of Classification Search
CPC ......... G06T 7/55; G06T 7/74; G06F 16/9537; G06F 16/29; B60R 21/00; G05D 1/0274; G05D 1/0088; G05D 1/0276; G05D 1/0217; G05D 1/0285; B62D 6/00; G08G 1/16; B60K 31/00; G06K 9/00798
See application file for complete search history.

(56) References Cited

U.S. PATENT DOCUMENTS

| | | | |
|---|---|---|---|
| 2017/0291603 A1* | 10/2017 | Nakamura | B60W 30/095 |
| 2018/0037227 A1* | 2/2018 | D'sa | B60W 50/045 |
| 2019/0226853 A1* | 7/2019 | Kubiak | G06T 3/0043 |
| 2020/0110422 A1* | 4/2020 | Takamatsu | B60W 40/072 |

FOREIGN PATENT DOCUMENTS

| | | |
|---|---|---|
| EP | 2 918 974 A1 | 9/2015 |
| JP | 2004-45227 A | 2/2004 |
| JP | 2012-242262 A | 12/2012 |
| JP | 2015-194397 A | 11/2015 |
| JP | 2017-9554 A | 1/2017 |

\* cited by examiner

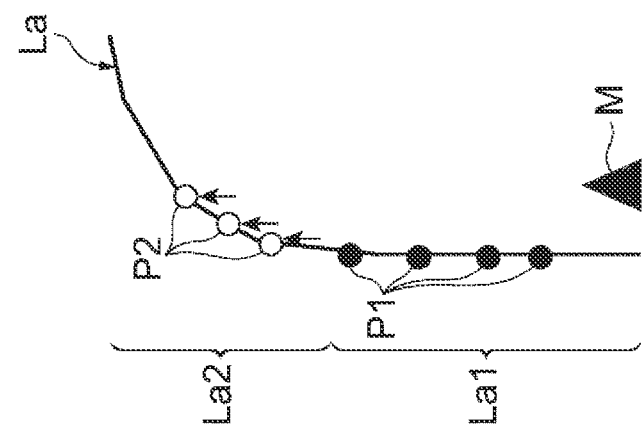
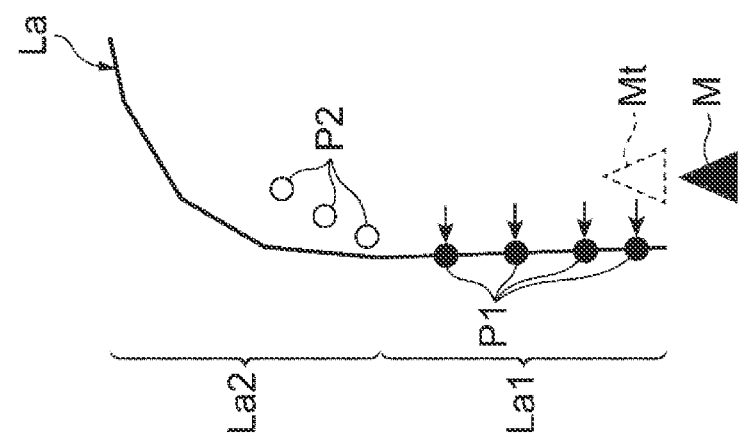
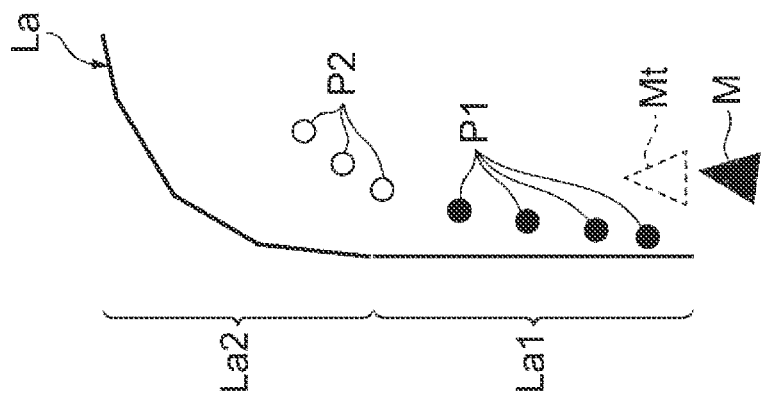

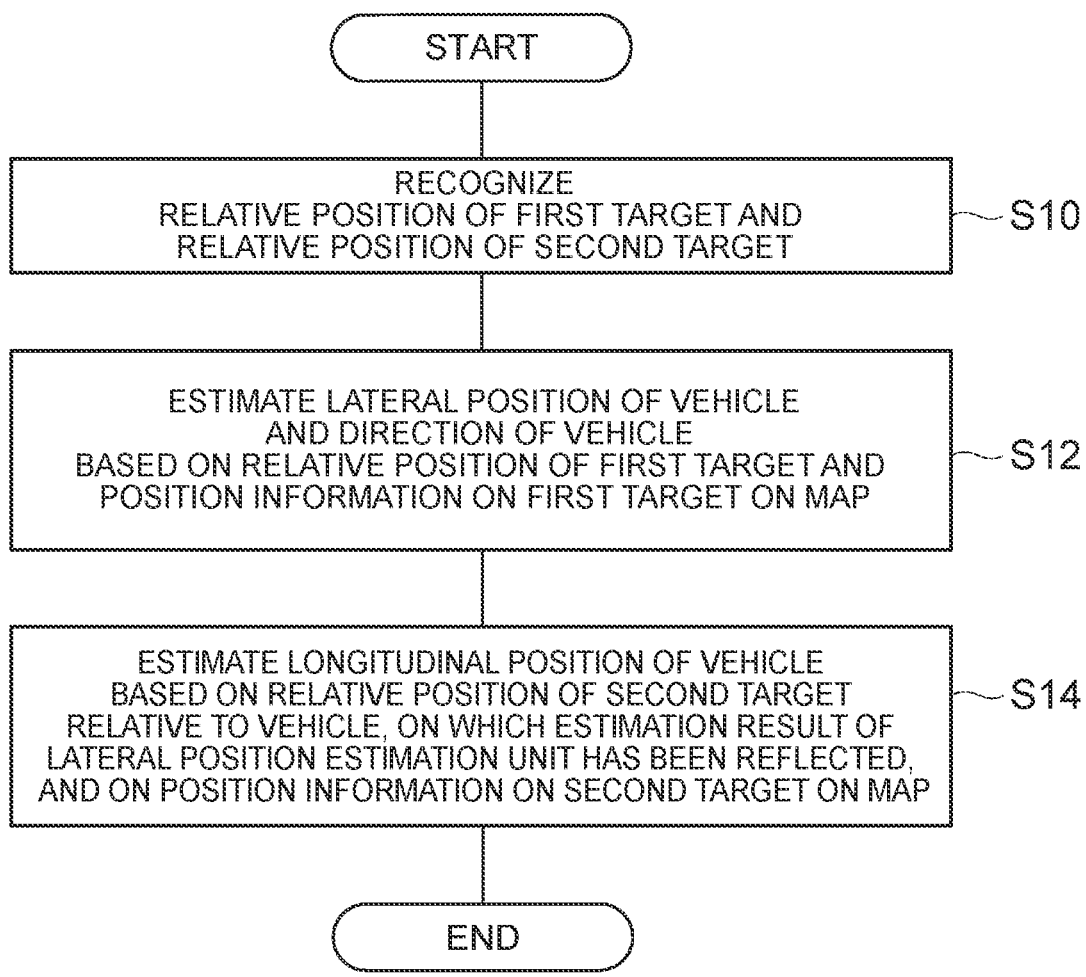

VEHICLE LOCALIZATION DEVICE

INCORPORATION BY REFERENCE

The disclosure of Japanese Patent Application No. 2017-213789 filed on Nov. 6, 2017 including the specification, drawings and abstract is incorporated herein by reference in its entirety.

BACKGROUND

1. Technical Field

The present disclosure relates to a vehicle localization device.

2. Description of Related Art

Japanese Patent Application Publication No. 2015-194397 (JP 2015-194397 A) is known as a technical document relating to a vehicle localization device. The technical document given above discloses a vehicle position detection device that detects the predicted position of a vehicle at the current time based on the map information and the captured images around the vehicle. This vehicle position detection device obtains a set of correspondences each between a line segment on the map and a captured line segment, based on the position information on a plurality of line segments on the map (marking lines of lanes, etc.) included in the map information and based on the positions of a plurality of line segments generated by detecting the line segments from the captured images of the vehicle's surroundings captured by the camera on the vehicle and then by performing bird's-eye view transformation for the detected line segments. After that, the vehicle position detection device updates the predicted position of the vehicle so that the position information on a line segment and the position of a line segment obtained from the captured image, which correspond to each other, match.

SUMMARY

A target that is used as the reference of a position on the map in vehicle localization is not limited to a line segment such as a marking line, but various targets such as a pedestrian crossing marking, a pole, a guardrail, etc., on the road surface are used as a target. Uniform processing, if performed for such various targets, may result in an erroneous recognition of a target or a decrease in the recognition accuracy of the position of a target. In this case, there is a problem that the accuracy of vehicle localization is decreased due to an erroneous recognition of a target or a decrease in the recognition accuracy of the position of a target.

The present disclosure provides a vehicle localization device that can prevent a decrease in the accuracy of vehicle position estimation.

A first aspect of the disclosure provides a vehicle localization device. The vehicle localization device includes a target database that stores position information on a first target on a map and position information on a second target on the map; a target recognition unit configured to recognize, based on a detection result of an in-vehicle sensor of the vehicle, a relative position of the first target relative to a vehicle and a relative position of the second target relative to the vehicle; a lateral position estimation unit configured to estimate a lateral position of the vehicle and a direction of the vehicle based on the relative position of the first target relative to the vehicle and the position information on the first target on the map, the lateral position of the vehicle being a position of the vehicle on the map in a width direction of a traveling lane on which the vehicle travels; and a longitudinal position estimation unit configured to estimate a longitudinal position of the vehicle based on the relative position of the second target relative to the vehicle and the position information on the second target on the map, the relative position of the second target relative to the vehicle reflecting the lateral position of the vehicle and the direction of the vehicle, the longitudinal position of the vehicle being a position of the vehicle on the map in an extending direction of the traveling lane.

The vehicle localization device in the configuration described above distinguishes between the first target for lateral position estimation and the second target for longitudinal position estimation to allow for the lateral position estimation and the longitudinal position estimation, respectively, of the vehicle. Estimating the lateral position of the vehicle and the longitudinal position of the vehicle in this way makes it possible to prevent the recognition result of a target, not suitable for lateral position estimation (misrecognition or low-accuracy position recognition), from affecting the estimation of the lateral position of the vehicle, and to prevent the recognition result of a target, not suitable for longitudinal position estimation, from affecting the estimation of the longitudinal position of the vehicle, thus preventing a decrease in the estimation accuracy of the position of the vehicle. In addition, in the configuration described above, the vehicle localization device estimates the longitudinal position of the vehicle based on the relative position of the second target relative to the vehicle, on which the estimated lateral position of the vehicle and the estimated direction of the vehicle have been reflected, and on the position information on the second target on the map stored in the target database. Therefore, the vehicle localization device prevents a decrease in the estimation accuracy of the longitudinal position of the vehicle, caused due to the influence of a deviation in the lateral position of the vehicle and in the direction of the vehicle, more effectively when the longitudinal position of the vehicle is estimated by the vehicle localization device in the configuration described above than when the vehicle position (lateral position and longitudinal position) is estimated at a time without distinguishing between the first target and the second target.

In the first aspect of the disclosure, in the target database, the first target may include a straight marking line corresponding to a straight road section and the second target may include at least one curved marking line corresponding to a curve of a road, the target recognition unit may be configured to recognize, based on the detection result of the in-vehicle sensor, a relative position of the straight marking line relative to the vehicle and a relative position of the at least one curved marking line relative to the vehicle, the lateral position estimation unit may be configured to estimate, based on the relative position of the straight marking line relative to the vehicle and position information on the straight marking line on the map, the lateral position of the vehicle and the direction of the vehicle, and the longitudinal position estimation unit may be configured to estimate the longitudinal position of the vehicle based on the relative position of the at least one curved marking line relative to the vehicle and position information on the at least one curved marking line on the map, the relative position of the at least one curved marking line relative to the vehicle reflecting the lateral position of the vehicle and the direction of the vehicle.

The vehicle localization device in the configuration described above estimates the lateral position of the vehicle and the direction of the vehicle using the straight marking line useful for lateral position estimation and, in addition, estimates the longitudinal position of the vehicle based on the relative position of the curved marking line relative to the vehicle, on which the estimated lateral position of the vehicle and the estimated direction of the vehicle have been reflected, and the position information on the curved marking line on the map. Therefore, the vehicle localization device prevents a decrease in the estimation accuracy of the longitudinal position of the vehicle, caused due to the influence of a deviation in the lateral position of the vehicle and in the direction of the vehicle, more effectively when the longitudinal position of the vehicle is estimated by the vehicle localization device in the configuration described above than when the vehicle position (lateral position and longitudinal position) is estimated at a time without distinguishing between the straight marking line and the curved marking line.

In the first aspect of the disclosure, the vehicle localization device may further include an enlargement ratio calculation unit configured to calculate an enlargement ratio of a curve width, when the target recognition unit detects (i) a relative position of a left-side curved marking line corresponding to a curve in the traveling lane and (ii) a relative position of a right-side curved marking line corresponding to the curve in the traveling lane, the left-side curved marking line being included in the at least one curved marking line, the right-side curved marking line being included in the at least one curved marking line, wherein the longitudinal position estimation unit may be configured not to compare a relative position of a part included in the left-side curved marking line or the right-side curved marking line, the part having the enlargement ratio equal to or higher than a predetermined enlargement ratio threshold, with the position information on the at least one curved marking line on the map.

When there is a branch path branching off from a curve in the traveling lane the vehicle, the branch marking line corresponding to the branch path is sometimes erroneously recognized as the curved marking line of the curve. The vehicle localization device in the configuration described above can prevent a decrease in the estimation accuracy of the longitudinal position of the vehicle caused by an erroneous recognition between the branch marking line and the curved marking line.

In the first aspect of the disclosure, the enlargement ratio calculation unit may be configured to calculate a ratio of enlargement of a distance between the left-side curved marking line and the right-side curved marking line to a width of a straight road section of the traveling lane as the enlargement ratio of the curve width.

In the first aspect of the disclosure, in the target database, the second target may include a branch marking line corresponding to a branch path, and the longitudinal position estimation unit may be configured to estimate the longitudinal position of the vehicle based on a relative position of the branch marking line relative to the vehicle and position information on the branch marking line on the map, the relative position of the branch marking line relative to the vehicle reflecting the lateral position of the vehicle and the direction of the vehicle.

The vehicle localization device in the configuration described above allows the longitudinal position of the vehicle to be estimated using the branch marking line corresponding to the branch path. This makes it possible for the vehicle localization device to estimate the longitudinal position of the vehicle using the branch marking line even if the curved marking line cannot be properly recognized.

A second aspect of the disclosure provides a vehicle localization device. The vehicle localization device includes a target database that stores position information on a first target on a map and position information on a second target on the map; and an electronic control unit configured to recognize, based on a detection result of an in-vehicle sensor of the vehicle, a relative position of the first target relative to a vehicle and a relative position of the second target relative to the vehicle, estimate a lateral position of the vehicle and a direction of the vehicle based on the relative position of the first target relative to the vehicle and the position information on the first target on the map, the lateral position of the vehicle being a position of the vehicle on the map in a width direction of a traveling lane on which the vehicle travels, and estimate a longitudinal position of the vehicle based on the relative position of the second target relative to the vehicle and the position information on the second target on the map, the relative position of the second target relative to the vehicle reflecting the lateral position of the vehicle and the direction of the vehicle, the longitudinal position of the vehicle being a position of the vehicle on the map in an extending direction of the traveling lane.

As described above, the vehicle localization device in one embodiment of the present disclosure can prevent a decrease in the accuracy of vehicle localization.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2A is a diagram showing the situation before the lateral position of a vehicle that will enter a curve is estimated;

FIG. 2B is a diagram showing the estimation of the lateral position of the vehicle and the direction of the vehicle;

FIG. 2C is a diagram showing the estimation of the longitudinal position of the vehicle;

FIG. 3 is a flowchart showing an example of vehicle localization processing;

DETAILED DESCRIPTION OF EMBODIMENTS

Embodiments of the present disclosure will be described below with reference to the drawings.

First Embodiment

Figure 1:
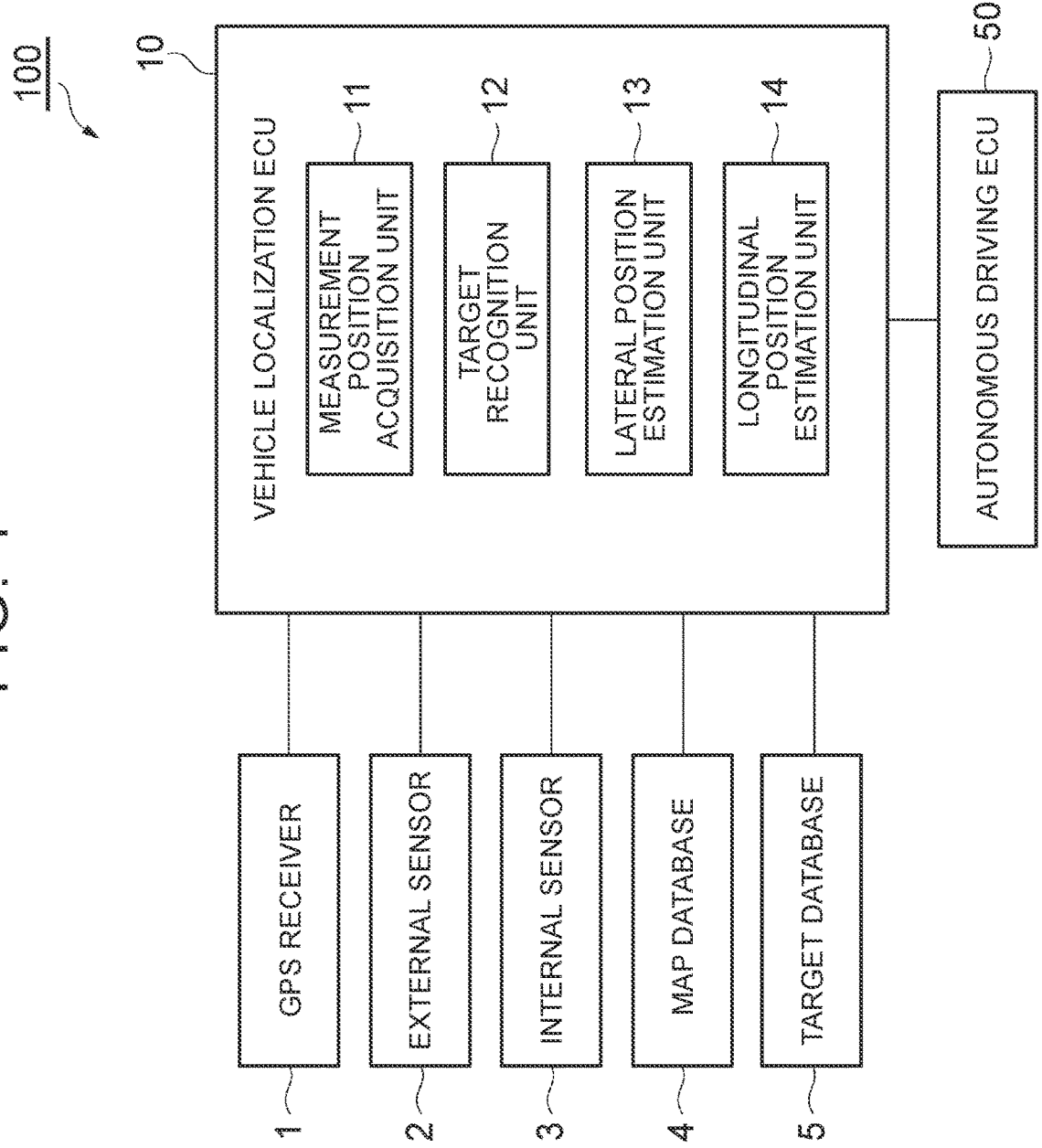
FIG. 1 is a block diagram showing a vehicle localization device in a first embodiment.

FIG. 1 is a block diagram showing a vehicle localization device in a first embodiment. A vehicle localization device 100 shown in FIG. 1 is a device for estimating the position of a vehicle that is the position of a vehicle, such as a passenger car, on a map. The vehicle localization device 100 estimates the lateral position of the vehicle, which is the position on the map in the width direction of the traveling lane on which the vehicle is traveling, and the longitudinal position of the vehicle, which is the position on the map in the extending direction of the traveling lane, as the position of the vehicle.

Configuration of Vehicle Localization Device in the First Embodiment

As shown in FIG. 1, the vehicle localization device 100 includes a vehicle localization Electronic Control Unit [ECU] 10 for integrally managing the system. The vehicle localization ECU 10 is an electronic control unit having a Central Processing Unit [CPU], a Read Only Memory [ROM], a Random Access Memory [RAM], and a Controller Area Network [CAN] communication circuit. In the vehicle localization ECU 10, a program stored in the ROM is loaded into the RAM and the program loaded in the RAM is executed by the CPU to implement various functions. The vehicle localization ECU 10 may be configured by a plurality of electronic units.

The vehicle localization ECU 10 is connected to a GPS receiver 1, an external sensor (in-vehicle sensor) 2, an internal sensor 3, a map database 4, a target database 5, and an autonomous driving ECU 50.

The GPS receiver 1 is a measuring unit that measures the position of the vehicle on the map (for example, the latitude and longitude of the vehicle) by receiving signals from three or more GPS satellites. The GPS receiver 1 sends the measured position information on the vehicle to the vehicle localization ECU 10.

The external sensor 2 is a detection apparatus (in-vehicle sensor) mounted on a vehicle for detecting the situation around the vehicle. The external sensor 2 includes at least one of a camera and a radar sensor.

The camera is a capturing apparatus for capturing the external situation of the vehicle. The camera is provided on the interior side of the windshield of the vehicle. The camera sends the captured information on the external situation of the vehicle to the vehicle localization ECU 10. The camera may be a monocular camera or a stereo camera. The stereo camera includes two capturing units arranged so that the disparity between the right eye and the left eye can be reproduced. The information captured by the stereo camera also includes the depth-direction information. The camera may be provided for capturing the area to the side of the vehicle.

The radar sensor is a detection apparatus that detects an object around the vehicle using radio waves (for example, millimeter waves) or light. The radar sensor includes, for example, a millimeter wave radar or a lidar [LIDAR: Light Detection And Ranging]. The radar sensor sends radio waves or light to the surroundings of the vehicle and detects an object by receiving radio waves or light reflected by the object. The radar sensor sends the detected object information to the vehicle localization ECU 10. The radar sensor may be configured by a plurality of sensors including both a millimeter wave radar and a lidar. The radar sensor may be provided to detect an object to the side of the vehicle.

The internal sensor 3 is a detection apparatus that detects the traveling state of the vehicle. The internal sensor 3 includes a vehicle speed sensor, an acceleration sensor, and a yaw rate sensor. The vehicle speed sensor is a detection apparatus that detects the speed of the vehicle. An example of the vehicle speed sensor is a wheel speed sensor that is provided on the wheels of the vehicle or on the drive shaft that rotates in synchronization with the wheels to detect the rotation speed of the wheels. The vehicle speed sensor sends the detected vehicle speed information (wheel speed information) to the vehicle localization ECU 10.

The acceleration sensor is a detection apparatus that detects the acceleration of the vehicle. For example, the acceleration sensor includes a longitudinal acceleration sensor that detects the acceleration in the longitudinal direction of the vehicle and a lateral acceleration sensor that detects the acceleration in the lateral direction of the vehicle. The acceleration sensor sends the acceleration information on the vehicle to the vehicle localization ECU 10. The yaw rate sensor is a detection apparatus that detects the yaw rate (turning angle velocity) around the vertical axis at the center of gravity of the host vehicle. For example, a gyro sensor may be used as the yaw rate censor. The yaw rate sensor sends the detected yaw rate information on the vehicle to the vehicle localization ECU 10.

The detection result (vehicle speed information, yaw rate information, etc.) of the internal sensor 3 may be used for measuring the position of the vehicle on the map. In this case, the internal sensor 3 functions as a measurement unit for measuring the position of the vehicle on the map. It should be noted that the vehicle localization ECU 10 is not necessarily connected to the internal sensor 3.

The map database 4 is a database that stores map information. The map database 4 is formed, for example, in a Hard Disk Drive [HDD] mounted in the vehicle. The map information includes the position information on the roads (position information on the lanes), information on the road shapes (for example, a curved, type of straight road section, a curvature, etc.), and the position information on the intersections and branch points. The map database 4 may be formed in a server capable of communicating with the vehicle.

The target database 5 is a database that stores the target information on the targets. A target, an object whose position on the map is known, is used as a reference for vehicle localization. Targets include marking lines including at least one of a vehicular lane line, a lane line, and a center line.

Targets include a first target for lateral position estimation and a second target for longitudinal position estimation. The first targets for lateral position estimation includes a straight marking line corresponding to a straight road section. A straight marking line corresponding to a straight road section is a marking line having a curvature smaller than a first curve threshold. The first curve threshold is a preset threshold for identifying a straight marking line useful for lateral position estimation. The first curve threshold may be a constant value or may be changed according to a region. A straight marking line, required to be identified only for vehicle localization, does not need to completely match the marking line of a section stored in the map information as a straight road section.

The first target for lateral position estimation may include structures extending along the road. The structures extending along the road includes at least one of a wall, a fence, a signboard, a guardrail, and a curbstone.

The first target for lateral position estimation may include a road boundary. The road boundary is a road end that is the boundary between the road and the non-road area in the width direction (road width direction). For example, the road boundary includes the boundary between the asphalt paved road and the ground in the width direction of the asphalt paved road provided on the ground. The road boundary, when used as the first target for lateral position estimation, can be used also for determining the traveling lane on which the vehicle travels while traveling on a multi-lane road. In addition to those given above, a known target useful for the lateral position estimation of the vehicle can be used as the first target for lateral position estimation.

The second target for longitudinal position estimation includes, for example, a curved marking line corresponding to a curve. A curved marking line corresponding to a curve is a marking line having a curvature equal to or larger than a second curve threshold. The second curve threshold is a preset threshold for identifying, from among the marking lines, a curved marking line useful for longitudinal position estimation.

The second curve threshold may be a constant value or may be changed according to a region. The second curve threshold is a threshold equal to or larger than the first curve threshold. That is, between a straight marking line and a curved marking line, there may be a marking line that is used neither for lateral position estimation nor for longitudinal position estimation. In addition, a curved marking line, required to be identified only for vehicle localization, does not need to completely match the marking line of a section stored in the map information as a curve. The second target is required only to include a curved marking line that is within a predetermined distance from a straight marking line in the same marking line.

The second target for longitudinal position estimation may include road signs such as a turn prohibition marking, a maximum speed marking, a diamond marking, a triangle marking, a traveling direction marking, a pedestrian crossing marking, a stop line, and so on. The second targets may include at least one of the structures such as a pole, a delineator, a traffic light, a manhole, the exit and the entrance of a tunnel, an ETC gate, and so on. In addition to those given above, a known target useful for the longitudinal position estimation of the vehicle can be used as the second target for longitudinal position estimation.

The first target and the second target may be different targets that do not overlap each other. Alternatively, the first target and the second target may be the same target. When a marking line including a straight marking line is indicated as a broken line, the second target may include each of the line segments of the broken line. In this case, the relative positions of the ends (front end, rear end) of each line segment, indicated by the broken line, in the road extending direction can be used for the longitudinal position estimation of the vehicle.

The target information stored in the target database 5 includes the position information on a target on the map and the feature information on the target. The position information on a target on the map includes the position information on the first target on the map and the position information on the second target on the map. The feature information on a target is the information for recognizing (identifying) the target from the detection result of the external sensor 2. The feature information on a target may include the information on the type of the target (type information indicating that the target is a pole, a marking line, etc.,), the information on the shape of the target, and the information on the size of the target. The feature information on a target may be stored separately from the target information stored in the target database 5.

The target database 5 does not necessarily have to be mounted on the vehicle but may be formed in a server capable of communicating with the vehicle. In addition, the target database 5 may be configured as a database integrated with the map database 4. In this case, the target information may be integrated with the map information stored in the map database 4.

The autonomous driving ECU 50, mounted on the vehicle, is an electronic control unit for performing the autonomous driving of the vehicle. Autonomous driving refers to vehicle control for autonomously driving a vehicle without driver's driving operation. The autonomous driving ECU 50 may be configured by a plurality of electronic units. A part of the functions of the autonomous driving ECU 50 may be performed by a server capable of communicating with the vehicle.

The autonomous driving ECU 50 recognizes the surrounding environment of the vehicle (such as the position of another vehicle around the vehicle), based on the detection result of the external sensor 2. The autonomous driving ECU 50 recognizes the vehicle state, such as the vehicle speed and the yaw rate, based on the detection result of the internal sensor 3. The autonomous driving ECU 50 generates a travel plan along a preset target route, based on the vehicle position estimated by the vehicle localization device 100, the map information stored in the map database 4, the surrounding environment of the vehicle, and the vehicle state. The target route may be manually set by an occupant of the vehicle or may be automatically set by a known navigation system or the autonomous driving ECU 50.

The autonomous driving ECU 50 performs autonomous driving according to the travel plan. The autonomous driving ECU 50 performs autonomous driving by sending the control signal to the actuators (engine actuator, steering actuator, brake actuator, etc.) of the vehicle. The autonomous driving ECU 50 can generate a travel plan, and perform autonomous driving, by a known method. Note that the vehicle localization ECU 10 is not necessarily connected to the autonomous driving ECU 50.

Next, the functional configuration of the vehicle localization ECU 10 will be described. The vehicle localization ECU 10 includes a measurement position acquisition unit 11, a target recognition unit 12, a lateral position estimation unit 13, and a longitudinal position estimation unit 14.

The measurement position acquisition unit 11 acquires the measurement position, which is a position of the vehicle on the map, based on the position information on the vehicle measured by the GPS receiver 1. The measurement position acquisition unit 11 may also acquire the measurement position of the vehicle from the history of the vehicle speed of the vehicle (or the history of the number of revolutions of the wheels) and the history of the yaw rate of the vehicle, based on the detection result of the internal sensor 3. In other words, the measurement position acquisition unit 11 may acquire the measurement position of the vehicle through the so-called odometry using a known method.

The target recognition unit 12 recognizes the relative position of the first target relative to the vehicle and the relative position of the second target relative to the vehicle. For example, using the measurement position of the vehicle measured by the measurement position acquisition unit 11, the target recognition unit 12 selects the candidates for the first target and the candidates for the second target, which are the candidates for the targets detected by the external sensor 2 of the vehicle, from the target information stored in the target database 5. Then, based on the detection result of the external sensor 2 and on the feature information on the selected target candidates (for example, the type, shape, and size of the target), the target recognition unit 12 recognizes the first target and the second target that are present around the vehicle. The target recognition unit 12 recognizes the relative position (relative positions relative to the vehicle) of the recognized first target and the relative position of the recognized second object relative to the vehicle, based on the detection result of the external sensor 2.

Note that the target recognition unit 12 does not always need to use the measurement position of the vehicle. If the vehicle position was already estimated in the past, the vehicle position estimated in the past (for example, estimated in the estimation processing performed immediately before) may be used instead. The relative position of the first target and the relative position of the second target may be recognized from the image captured by the camera of the external sensor 2, may be recognized from the object information acquired by the radar sensor of the external sensor 2, or may be recognized from both the captured image and the object information. The method for recognizing the relative position of the first target and the relative position of the second target is not limited to the method described above but various methods may be used.

The target recognition unit 12 recognizes a part of a marking line whose curvature is smaller than the first curve threshold as a straight marking line (first target), and a part of a marking line whose curvature is equal to or larger than the second curve threshold as a curved marking line (second target). A known method may be used for recognizing the curvature of a marking line.

The lateral position estimation unit 13 estimates the lateral position of the vehicle and the direction of the vehicle, based on the relative position of the first target relative to the vehicle, recognized by the target recognition unit 12, and the position information on the first target on the map stored in the target database 5. The lateral position of the vehicle is the position of the vehicle on the map in the width direction of the traveling lane on which the vehicle travels. The direction of the vehicle is the direction of the vehicle on the map (the direction of the vehicle with respect to the traveling lane).

The lateral position estimation unit 13 estimates the lateral position of the vehicle and the direction of the vehicle by comparing the relative position of the first target relative to the vehicle with the position information on the first target on the map. The comparison is made, for example, by the least squares matching method. The method for estimating the lateral position of the vehicle M and the direction of the vehicle M performed by comparing the relative position of the first target with the position information on the first target on the map is not limited to a particular method, but various methods can be used.

FIG. 2A is a diagram showing the situation before the lateral position of a vehicle that will enter a curve is estimated. FIG. 2A shows the vehicle M before its lateral position is estimated, the marking line La indicating the outer end of the traveling lane of the vehicle, the straight marking line La1 that is a part of the marking line La and that corresponds to the straight road section, the curved marking line La2 that is a part of the marking line La and that corresponds to the curve, the relative positions P1 of the straight marking line La1 relative to the vehicle M recognized by the target recognition unit 12, and the relative positions P2 of the curved marking line La2 relative to the vehicle M recognized by the target recognition unit 12.

The vehicle M shown in FIG. 2A, which is the vehicle before the lateral position is estimated, corresponds to the measurement position that the measurement position acquisition unit 11 has acquired from the measurement result of the GPS receiver 1. On the other hand, the vehicle Mt, indicated by the broken line, indicates the case when the vehicle M is at the correct position on the map (the position that is the target of vehicle localization). That is, in FIG. 2A, the measurement position of the vehicle M deviates from the correct position on the map. The direction of the vehicle M is also incorrect. FIG. 2A shows the case in which the target recognition unit 12 has recognized the relative positions P1 of the straight marking line La1 and the relative positions P2 of the curved marking line La2 as a row of detection points detected by the radar sensor.

FIG. 2B is a diagram showing the estimation of the lateral position of the vehicle M and the direction of the vehicle M. Note that the lateral position of the vehicle and the direction of the vehicle, estimated by the lateral position estimation unit 13, have already been reflected on the lateral position of the vehicle M and the direction of the vehicle M shown in FIG. 2B.

As shown in FIG. 2B, the lateral position estimation unit 13 estimates the lateral position of the vehicle M and the direction of the vehicle M by comparing the relative positions P1 of the straight marking line La1, recognized by the target recognition unit 12, with the position information on the straight marking line La1 on the map stored in the target database 5.

The longitudinal position estimation unit 14 estimates the longitudinal position of the vehicle, based on the relative position of the second target relative to the vehicle M on which the lateral position of the vehicle M and the direction of the vehicle M, estimated by the lateral position estimation unit 13, have been reflected and on the position information on the second target on the map stored in the target database 5.

"The relative position of the second target relative to the vehicle M on which the lateral position of the vehicle M and the direction of the vehicle M, estimated by the lateral position estimation unit 13, have been reflected" means the relative position of the second target whose relationship with the position information on the second target on the map is corrected by correcting the lateral position of the vehicle M on the map and its direction, which are used as the reference, according to the estimation result of the lateral position estimation unit 13. That is, as shown in FIG. 2A and FIG. 2B, the relationship of the relative positions P2 of the curved marking line La2 relative to the vehicle M with the position information on the curved marking line La2 on the map is corrected by correcting the lateral position of the vehicle M and the direction of the vehicle M on the map according to the estimation result of the lateral position estimation unit 13.

The longitudinal position estimation unit 14 estimates the longitudinal position of the vehicle by comparing the relative position of the second target relative to the vehicle M on which the lateral position of the vehicle M and the direction of the vehicle M, estimated by the lateral position estimation unit 13, have been reflected (the corrected relative position of the second target) with the position information on the second target on the map. The comparison is made, for example, by the least squares matching method. The method for estimating the longitudinal position of the vehicle M is not limited to a particular method but various methods can be used, as long as the relative position of the corrected second target that is used, FIG. 2C is a diagram showing the estimation of the longitudinal position of the vehicle. As shown in FIG. 2C, the longitudinal position estimation unit 14 compares the relative positions P2 of the curved marking line La2 relative to the vehicle M, on which the estimation result of the lateral position estimation unit 13 has been reflected in FIG. 2B, with the position information on the curved marking line La2 on the map stored in the target database 5. By doing so, the longitudinal position estimation unit 14 estimates the longitudinal position of the vehicle M while minimizing the influence of a deviation in the lateral position of the vehicle M and the direction of the vehicle M.

Vehicle Localization Processing in the First Embodiment

Next, the vehicle localization processing performed by the vehicle localization device 100 in the first embodiment will be described with reference to FIG. 3. FIG. 3 is a flowchart showing an example of the vehicle localization processing. The processing of the flowchart shown in FIG. 3 is performed, for example, while the vehicle M travels. It is assumed that the measurement position acquisition unit 11 acquires the measurement position of the vehicle M as needed.

As shown in FIG. 3, in step S10, the vehicle localization ECU 10 of the vehicle localization device 100 uses the target recognition unit 12 to recognize the relative position of the first target and the relative position of the second target. The target recognition unit 12 recognizes the relative position of the first target and the relative position of the second target around the vehicle M, based on the detection result of the external sensor 2, the measurement position of the vehicle M measured by the measured position acquisition unit 11 (or the position of the vehicle estimated immediately before), and the target information stored in the target database 5.

In S12, the vehicle localization ECU 10 uses the lateral position estimation unit 13 to estimate the lateral position of the vehicle M and the direction of the vehicle M. The lateral position estimation unit 13 estimates the lateral position of the vehicle M and the direction of the vehicle M, based on the relative position of the first target relative to the vehicle M recognized by the target recognition unit 12 and the position information on the first target on the map stored in the target database 5.

In S14, the vehicle localization ECU 10 uses the longitudinal position estimation unit 14 to estimate the longitudinal position of the vehicle M. The longitudinal position estimation unit 14 estimates the longitudinal position of the vehicle by comparing the relative position of the second object relative to the vehicle M, on which the lateral position of the vehicle M and the direction of the vehicle M estimated by the lateral position estimation unit 13 have been reflected, with the position information on the second target on the map stored in the target database 5. After that, the vehicle localization ECU 10 terminates the current processing. The vehicle localization ECU 10 repeats the processing from S10 again after an elapse of a predetermined time.

Note that, in S10, the relative position of the first target and the relative position of the second target are not necessarily recognized at the same time. If the relative position of the second target is recognized, but if the relative position of the first target cannot be recognized, by the target recognition unit 12 at the same time, the vehicle localization ECU 10 may perform the processing in S12 using the relative position of the first target that was recognized in the processing performed last. Alternatively, the vehicle localization ECU 10 may perform the processing in S12 only if the target recognition unit 12 recognizes both the relative position of the first target and the relative position of the second target at the same time.

Effects of the Vehicle Localization Device in the First Embodiment

The vehicle localization device 100 in the first embodiment described above estimates the lateral position of the vehicle M and the longitudinal position of the vehicle M, separately, by distinguishing between the first target for lateral position estimation and the second target for longitudinal position estimation. Estimating the lateral position of the vehicle M and the longitudinal position of the vehicle M in this way makes it possible to prevent the recognition result of a target, not suitable for lateral position estimation (misrecognition or low-accuracy position recognition), from affecting the estimation of the lateral position of the vehicle, and to prevent the recognition result of a target, not suitable for longitudinal position estimation, from affecting the estimation of the longitudinal position of the vehicle, thus preventing a decrease in the estimation accuracy of the longitudinal position of the vehicle M.

Furthermore, the vehicle localization device 100 estimates the lateral position of the vehicle M and the direction of the vehicle M using the first target such as a straight marking line useful for lateral position estimation; in addition, the vehicle localization device 100 estimates the longitudinal position of the vehicle M, based on the relative position of the second target (curved marking line and so on) relative the vehicle M on which the estimated lateral position of the vehicle M and the estimated direction of the vehicle M have been reflected, and based on the position information on the second target on the map stored in the target database. Therefore, the vehicle localization device 100 prevents a decrease in the estimation accuracy of the longitudinal position of the vehicle M, caused due to the influence of a deviation in the lateral position of the vehicle M and in the direction of the vehicle M, more effectively when the longitudinal position of the vehicle M is estimated according to the embodiment described above than when the vehicle position (lateral position and longitudinal position) is estimated at a time without distinguishing between the first target and the second target.

Second Embodiment

Figure 4:
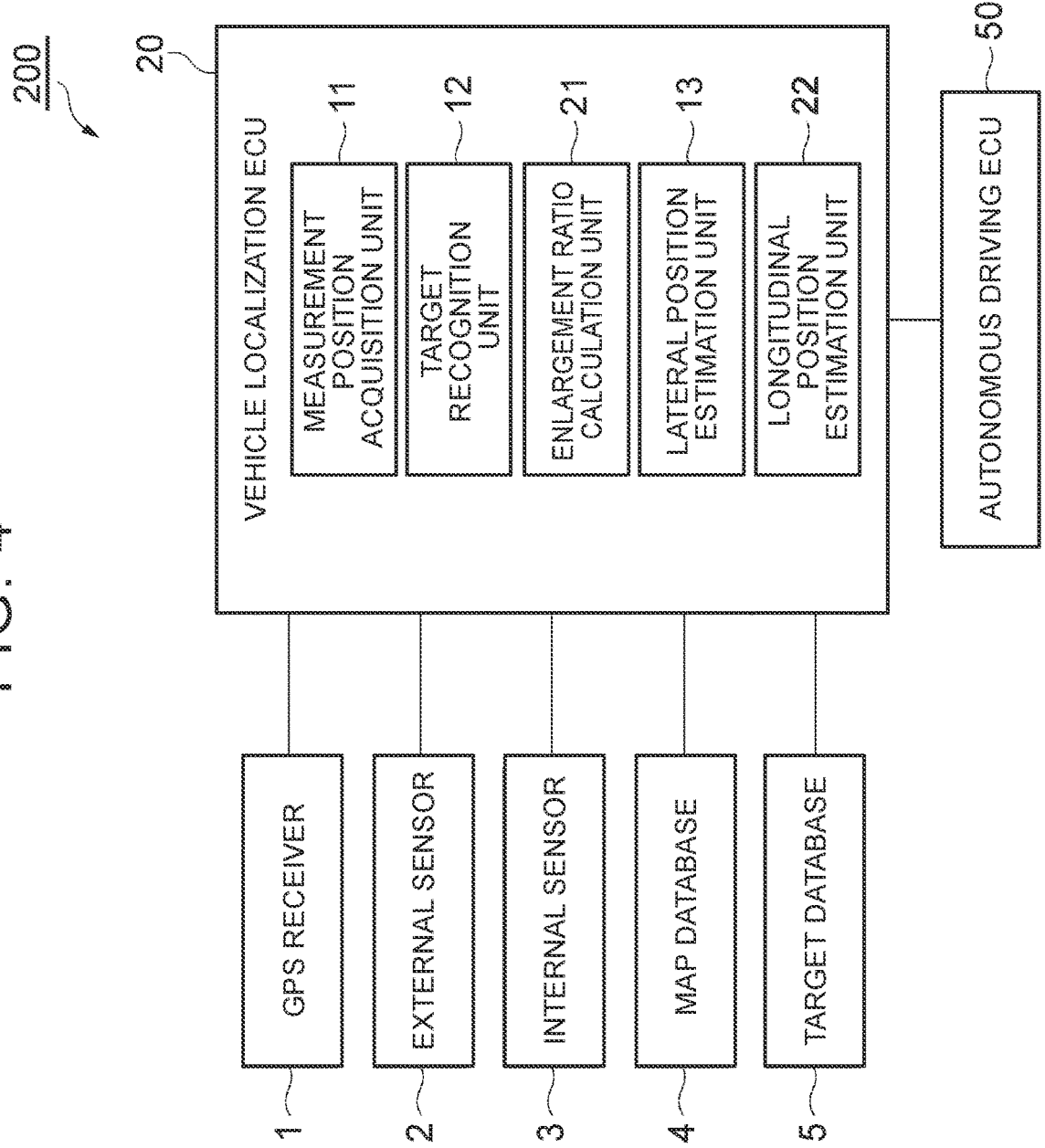
FIG. 4 is a block diagram showing a vehicle localization device in a second embodiment.

Next, a vehicle localization device in a second embodiment will be described. FIG. 4 is a block diagram showing the vehicle localization device in the second embodiment. In the description below, the same reference numeral is used for a component similar to that in the first embodiment and the duplicated description is omitted.

A vehicle localization device 200 shown in FIG. 4 differs from the vehicle localization device 100 in the first embodiment in that the vehicle localization device 200 does not perform longitudinal position estimation in a situation in which a branch marking line corresponding to a branch path is erroneously recognized as a curved marking line. A branch marking line that is erroneously recognized includes a marking line of a branch path that is already closed but remains undeleted on the road surface (undeleted marking line).

Figure 5A:
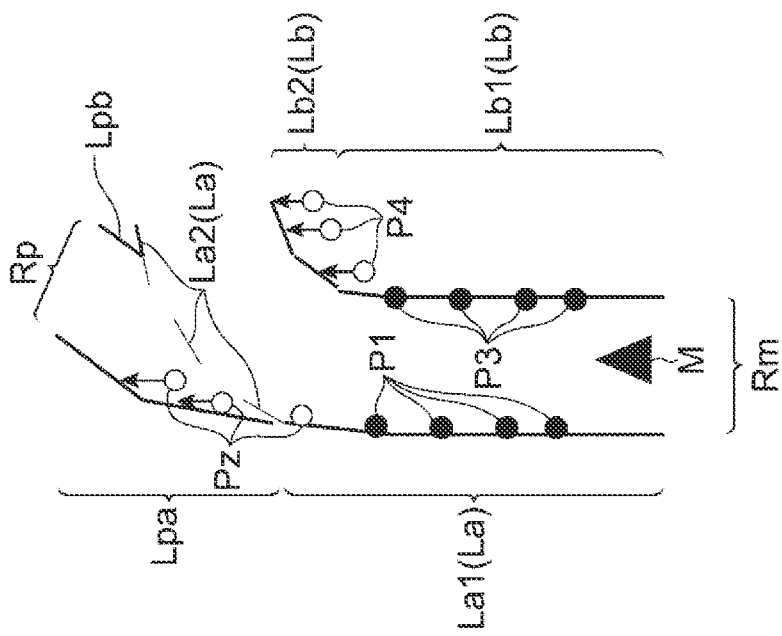
FIG. 5A is a diagram showing the case in which a branch marking line is erroneously recognized as a curved marking line.

FIG. 5A is a diagram showing the case in which a branch marking line is erroneously recognized as a curved marking line. FIG. 5A shows the situation in which the vehicle M enters a curve. FIG. 5A includes a traveling lane Rm of the vehicle M, a left-side marking line La of the traveling lane Rm, a right-side marking line Lb of the traveling lane Rm, a branch path Rp that branches off from the traveling lane Rm, a left-side branch marking line Lpa of the branch path Rp, a right-side branch marking line Lpb of the branch path Rp, and the relative positions Pz of the branch marking line Lpa that the target recognition unit 12 recognizes erroneously as a curved marking line La2. The left-side marking line La of the traveling lane Rm includes a straight marking line La1 and a curved marking line La2, and the right-side marking line Lb of the traveling lane Rm includes a straight marking line Lb1 and a curved marking line Lb2.

In FIG. 5A, the marking line of the part included in the curved marking line La2 and corresponding to the entrance of the branch path Rp (the part indicated by the thin line) has faded because of the passage of vehicles. In this case, there is a possibility that the target recognition unit 12 cannot recognize the curved marking line La2 and that the relative positions Pz of the branch marking line Lpa are recognized erroneously as the relative position of the curved marking line La2. As a result, as shown in FIG. 5A, there is a possibility that the relative positions Pz of the branch marking line Lpa relative to the vehicle M are used in the comparison erroneously as the position information on the curved marking line La2 on the map, with the result that the estimation accuracy of the longitudinal position of the vehicle M is decreased. The vehicle localization device 200 uses the enlargement ratio of a curve width to prevent a decrease in the estimation accuracy of the longitudinal position of the vehicle M that is caused by erroneously recognizing the branch marking line Lpa as the curved marking line La2.

For example, the enlargement ratio of a curve width is the enlargement ratio of the interval (distance) between the left-side curved marking line of the curve and the right-side curved marking line of the curve to the width of the straight road section before the curve of the traveling lane of the vehicle M. The width of the straight road section may be acquired from the map information or may be obtained from the detection result of the external sensor 2.

The enlargement ratio of the curve width may be calculated based, not on the width of the straight road section before the curve, but on the interval between the left-side curved marking line of the curve and the right-side curved marking line of the curve that is obtained from the detection result of the external sensor 2 and that is nearest to the entrance side of the curve.

Configuration of Vehicle Localization Device in the Second Embodiment

As shown in FIG. 4, a vehicle localization ECU 20 of the vehicle localization device 200 differs from the vehicle localization ECU 10 of the vehicle localization device 100 in the first embodiment in that an enlargement ratio calculation unit 21 is added and that the function of a longitudinal position estimation unit 22 is different from that of the longitudinal position estimation unit 14.

When the relative position of the left-side curved marking line of a curve in the traveling lane of the vehicle M and the relative position of the right-side curved marking line of the curve in the traveling lane are recognized by the target recognition unit 12, the enlargement ratio calculation unit 21 calculates the enlargement ratio of the curve width.

Figure 5B:
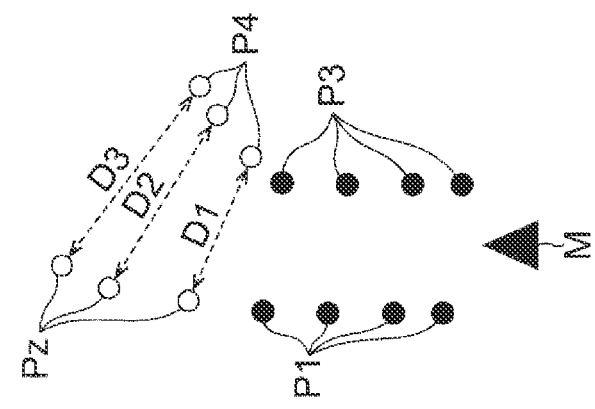
FIG. 5B is a diagram showing the enlargement ratio of the curve width.

FIG. 5B is a diagram showing the enlargement ratio of a curve width. FIG. 5B shows intervals D1 to D3 between the relative positions of the left-side curved marking line of a curve and the relative positions P4 of the right-side curved marking line of the curve. In FIG. 5B, the relative positions Pz of the branch marking line Lpa are erroneously recognized as the relative position of the left-side curved marking line of the curve. The intervals D1 to D3 are arranged in the order of the interval D1, interval D2, and interval D3 in the traveling direction of the vehicle M.

For example, the interval D1 can be obtained as an interval (straight-line distance) that is one of the intervals between the relative position Pz and the relative position P4, which are recognized as a plurality of detection points of the radar sensor, and that is shortest interval in the width direction between the relative position Pz and the relative position P4. The same applies to the intervals D2 and D3. Any other method for finding an interval may be used.

The enlargement ratio calculation unit 21 calculates each of the enlargement ratios of the interval D1, the interval D2, and the interval D3 with the width of the straight road section before the curve as the reference. The width of the straight section before the curve corresponds to the interval between the straight marking line La1 and the straight marking line Lb1. In FIG. 5B, since the relative position of the left-side curved marking line of the curve is the relative position obtained by erroneously recognizing the relative positions Pz of the branch marking line Lpa, each of the intervals D1 to D3 is larger than the width of the straight road section.

The method for calculating the enlargement ratio is not limited to the method described above. When the relative position of the left-side curved marking line of a curve and the relative position of the right-side curved marking line of the curve are recognized from the image captured by the camera (when the curved marking line is recognized as a line segment), the enlargement ratio calculation unit 21 may calculate the enlargement ratio by known image processing for obtaining the interval of line segments on the image. In this case, the enlargement ratio calculation unit 21 may calculate the enlargement ratio of the curve width at regular intervals in the traveling direction of the vehicle M.

The longitudinal position estimation unit 22 does not compare the relative position of a part, included in the left-side curved marking line of a curve or the right-side curved marking line of a curve and having an enlargement ratio equal to or higher than the enlargement ratio threshold, with the position information on the curved marking line on the map. The longitudinal position estimation unit 22 does not compare the relative position of a part having an enlargement ratio equal to or higher than the enlargement ratio threshold with the position information on any curved marking line on the map. The enlargement ratio threshold is a preset threshold used for determining whether there is an erroneous recognition between a branch marking line and a curved marking line. In the description below, a part that is included in the left-side curved marking line of a curve or the right-side curved marking line of a curve and that has an enlargement ratio equal to or higher than the enlargement ratio threshold is called a comparison non-targeted part; on the other hand, a part that is included in the left-side curved marking line of a curve or the right-side curved marking line of a curve and that has an enlargement ratio lower than the enlargement ratio threshold is called a comparison targeted part.

In FIG. 5B, since the enlargement ratios of the curve widths calculated from the intervals D1 to D3, corresponding to the relative positions Pz, are all equal to or higher than the enlargement ratio threshold, the longitudinal position estimation unit 22 does not compare the relative positions Pz, which are erroneously recognized as the relative position of the left-side curved marking line La2 of the curve, with the position information on the curved marking line La2 on the map. Also, the longitudinal position estimation unit 22 does not compare the relative positions P4 of the right-side curved marking line Lb2 of the curve, corresponding to the relative positions Pz, with the position information on the curved marking line La2 on the map.

If it is recognized that there is a branch path that branches off from the curve to the left, it is highly likely that the right-side curved marking line Lb2 of the curve is not an erroneously recognized branch marking line. Therefore, in this case, the longitudinal position estimation unit 22 may compare the relative positions P4 of the right-side curved marking line Lb2 of the curve with the position information on the curved marking line La2 on the map for estimating the longitudinal position of the vehicle M. The same is true when there is a branch path that branches off from the curve to the right side. The longitudinal position estimation unit 22 can recognize a branch path based on the map information stored in the map database 4 and the measurement position of the vehicle M acquired by the measurement position acquisition unit 11 (or the position of the vehicle estimated last).

The longitudinal position estimation unit 22 estimates the longitudinal position of the vehicle M, based on the relative position of a comparison targeted part relative to the vehicle M, on which the lateral position of the vehicle M and the direction of the vehicle M estimated by the lateral position estimation unit 13 have been reflected, and based on the position information on the curved marking line on the map stored in the target database 5. The longitudinal position estimation unit 22 estimates the longitudinal position of the vehicle M by comparing the relative position of a part of a curved marking line, which is the left-side curved marking line of a curve or the right-side curved marking line of a curve and which corresponds to the comparison targeted part, with the position information on each curved marking line on the map.

Note that the vehicle localization device 200 may use a branch marking line corresponding to a branch path for longitudinal position estimation. A branch path is a road (lane) branching off from the main road. The branch marking line in this case is a marking line that constitutes a part of the branch path and that is within a certain distance from the branch point of the branch path. A branch marking line may be overlapped with a curved marking line if its curvature is equal to or higher than the second curve threshold. The target database 5 stores the position information on a branch marking line on the map as the second target.

In this case, the target recognition unit 12 can use the target information, stored in the target database 5, to recognize a branch marking line. The target recognition unit 12 can recognize the relative position of a branch marking line relative to the vehicle M. When the relative position of a branch marking line is recognized by the target recognition unit 12, the longitudinal position estimation unit 22 estimates the longitudinal position of the vehicle M, based on the relative position of the branch marking line and the position information on the branch marking line on the map.

Figure 5C:
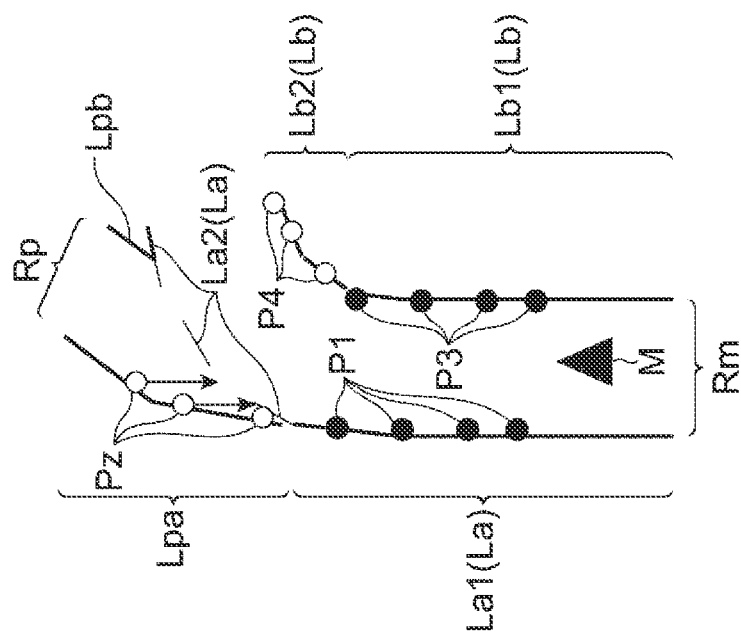
FIG. 5C is a diagram showing the estimation of the longitudinal position of a vehicle using a branch marking line.

FIG. 5C is a diagram showing the estimation of the longitudinal position of a vehicle using a branch marking line. In FIG. 5C, the target recognition unit 12 recognizes the relative positions Pz as the relative position of the branch marking line Lpa. The longitudinal position estimation unit 22 estimates the longitudinal position of the vehicle M by comparing the relative positions Pz of the branch marking line Lpa with the position information on the branch marking line Lpa on the map.

In FIG. 5C, the longitudinal position estimation unit 22 uses not only the branch marking line Lpa but also the relative positions P4 of the right-side curved marking line Lb2 of the curve for estimating the longitudinal position of the vehicle M. In addition, when the target recognition unit 12 recognizes the relative position of the left-side curved marking line La2 of the curve, the longitudinal position estimation unit 22 may use the relative position of the curved marking line La2 for estimating the longitudinal position of the vehicle M.

Vehicle Localization Processing in the Second Embodiment

Figure 6:
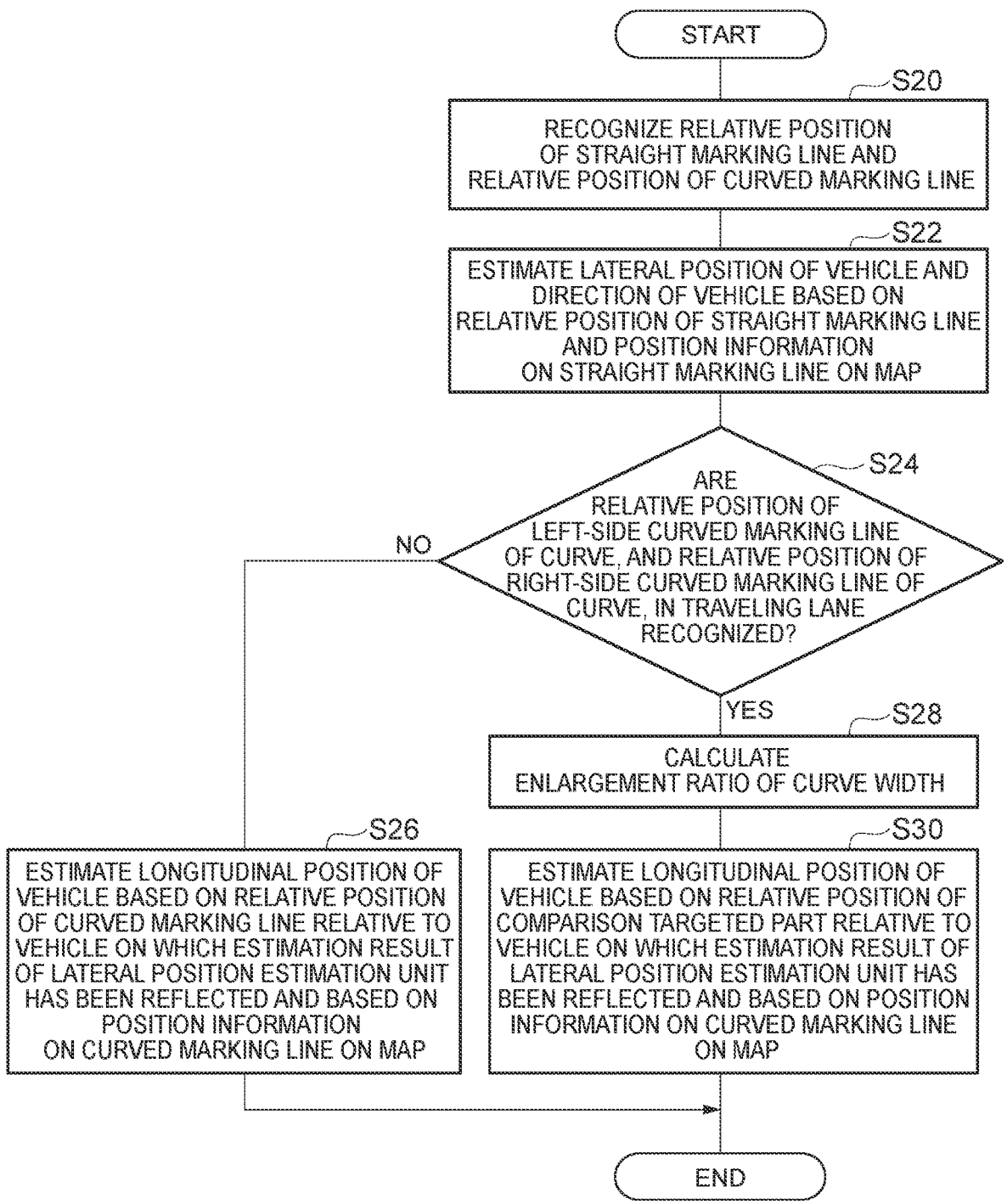
FIG. 6 is a flowchart showing an example of vehicle localization processing in the second embodiment.

Next, the vehicle position estimation processing by the vehicle localization device 200 in the second embodiment will be described with reference to FIG. 6. FIG. 6 is a flowchart showing an example of the vehicle localization processing in the second embodiment. In the description below, the processing performed when the vehicle M enters a curve will be described as an example of the vehicle localization processing in the second embodiment.

As shown in FIG. 6, in step S20, the vehicle localization ECU 20 of the vehicle localization device 200 uses the target recognition unit 12 to recognize the relative position of the straight marking line (first target) and the relative position of the curved marking line (second target). The target recognition unit 12 recognizes the straight marking line corresponding to the straight road section and the curved marking line corresponding to the curve, based on the detection result of the external sensor 2, the measured position of the vehicle M measured by the measurement position acquisition unit 11, and the target information stored in the target database 5.

In S22, the vehicle localization ECU 20 uses the lateral position estimation unit 13 to estimate the lateral position of the vehicle M and the direction of the vehicle M. The lateral position estimation unit 13 estimates the lateral position of the vehicle M and the direction of the vehicle M, based on the relative position of the straight marking line relative to the vehicle M and the position information on the straight marking line on the map stored in the target database 5.

In S24, the vehicle localization ECU 20 uses the enlargement ratio calculation unit 21 to determine whether the relative position of the left-side curved marking line of the curve, and the relative position of the right-side curved marking line of the curve, in the traveling lane of the vehicle M are recognized. The enlargement ratio calculation unit 21 performs the above determination based on the recognition result of the target recognition unit 12. If it is not determined that the relative position of the left-side curved marking line of the curve and the relative position of the right-side curved marking line of the curve are recognized (S24: NO), the processing of the vehicle localization ECU 20 proceeds to S26. If it is determined that the relative position of the left-side curved marking line of the curve and the relative position of the right-side curved marking line of the curve are recognized (S24: YES), the processing of the vehicle localization ECU 20 proceeds to S28.

In S26, the vehicle localization ECU 20 uses the longitudinal position estimation unit 22 to estimate the longitudinal position of the vehicle. The longitudinal position estimation unit 22 estimates the longitudinal position of the vehicle M based on the relative position of the comparison targeted part relative to the vehicle M on which the lateral position of the vehicle M and the direction of the vehicle M estimated by the lateral position estimation unit 13 have been reflected and based on the position information on the curved marking line on the map. After that, the vehicle localization ECU 20 terminates the current processing. The vehicle localization ECU 20 repeats the processing from S20 again after an elapse of a predetermined time.

In S28, the vehicle localization ECU 20 uses the enlargement ratio calculation unit 21 to calculate the enlargement ratio of the curve width. For example, the enlargement ratio calculation unit 21 calculates the enlargement ratio of the curve width with the width of the straight road section before the curve in the traveling lane Rm of the vehicle M as its reference.

In S30, the vehicle localization ECU 20 uses the longitudinal position estimation unit 22 to estimate the longitudinal position of the vehicle. In estimating the longitudinal position of the vehicle, the longitudinal position estimation unit 22 does not compare the relative position of a comparison non-targeted part, included in the left-side curved marking line of the curve and the right-side curved marking line of the curve and having an enlargement ratio equal to or higher than the enlargement ratio threshold, with the position information on the curved marking line of the curve on the map.

The longitudinal position estimation unit 22 estimates the longitudinal position of the vehicle M based on the relative position of a comparison targeted part (the part where the enlargement ratio is less than the enlargement ratio threshold) relative to the vehicle M on which the lateral position of the vehicle M and the direction the vehicle M estimated by the lateral position estimation unit 13 have been reflected and based on the position information on the curved marking line on the map. After that, the vehicle localization ECU 20 terminates the current processing. The vehicle localization ECU 20 repeats the processing from S20 again after an elapse of a predetermined time.

Effects of the Vehicle Localization Device in the Second Embodiment

When there is a branch path branching off from a curve in the traveling lane of a vehicle, the branch marking line corresponding to the branch path is sometimes erroneously recognized as the curved marking line of the curve. To address this problem, the vehicle localization device 200 in the second embodiment described above does not compare the relative position of a part, included in left-side curved marking line of the curve or the right-side curved marking line of the curve and having a curve-width enlargement ratio equal to or higher than the enlargement ratio threshold, with the position information on the curved marking line on the map. Therefore, the vehicle localization device 200 can prevent a decrease in the estimation accuracy of the longitudinal position of the vehicle that is caused by an erroneous recognition between the branch marking line and the curved marking line.

In addition, when a branch marking line is included in the second target in the target database 5, the vehicle localization device 200 can estimate the longitudinal position of the vehicle M using the branch marking line. This makes it possible for the vehicle localization device 200 to estimate the longitudinal position of the vehicle M using a branch marking line, even if a curved marking line cannot be properly recognized.

The preferred embodiments of the present disclosure have been described, but the present disclosure is not limited to the embodiments described above. The present disclosure can be implemented not only in the embodiments described above but also in various forms to which various modifications and improvements are added based on the knowledge of those skilled in the art.

For example, the vehicle localization device 100 or 200 may form a part of an autonomous driving system. In this case, the functions of the vehicle localization ECU 10 or 20 may be executed by the autonomous driving ECU 50.

The vehicle position (lateral position and longitudinal position) estimated by the vehicle localization device 100 or 200 is used not only for autonomous driving. The vehicle position may be used also for driving assistance control or route guidance for the driver. The vehicle localization ECU 10 or 20 may be connected, not to the autonomous driving ECU 50, but to the driving assistance ECU that executes known driving assistance control or to a known navigation system.

Although vehicle localization when the vehicle M enters a curve is described in FIGS. 2A to 2C, the present disclosure may be applied also when the vehicle M exits a curve (when the vehicle M exits a curve and then travels in the straight road section). In this case, the vehicle localization device 100 can estimate the lateral position of the vehicle M and the direction of the vehicle M using the straight marking line on the side of the vehicle M and then estimate the longitudinal position of the vehicle M using the curved marking line behind the vehicle M.

In the first embodiment, it is not always necessary to include a straight marking line in the first target and it is not always necessary to include a curved marking line in the second target.

A branch marking line may be included in the second target also in the vehicle localization device 100 in the first embodiment. The longitudinal position estimation unit 14 can estimate the longitudinal position of the vehicle based on the relative position of a branch marking line and the position information on the branch marking line on the map.

In the first embodiment, the lateral position estimation unit 13 may estimate the lateral position of the vehicle M and the direction of the vehicle M using the straight marking line of a lane other than the traveling lane Rm of the vehicle M (for example, the adjacent lane of the traveling lane Rm). Similarly, the longitudinal position estimation unit 14 may estimate the longitudinal position of the vehicle M using the curved marking line of a lane other than the traveling lane Rm of the vehicle M.

In the second embodiment, when it is recognized that there is a branch path branching off from a curve to the left and when a branch marking line is stored in the target database 5 as the second target, the longitudinal position estimation unit 22 may compare the relative position of a comparison non-targeted part, included in the left-side curved marking line of the curve and having an enlargement ratio equal to or higher than the enlargement ratio threshold, with the position information on the branch marking line on the map for estimating the longitudinal position of the vehicle. Similarly, when it is recognized that there is a branch path branching off from a curve to the right and when a branch marking line is stored in the target database 5 as the second target, the longitudinal position estimation unit 22 may compare the relative position of a comparison non-targeted part, included in the right-side curved marking line of the curve and having an enlargement ratio equal to or higher than the enlargement ratio threshold, with the position information on the branch marking line on the map for estimating the longitudinal position of the vehicle.

What is claimed is:

1. A vehicle localization device comprising:
   a target database that stores position information on a first target on a map and position information on a second target on the map;
   a target recognition unit configured to recognize, based on a detection result of an in-vehicle sensor of the vehicle, a relative position of the first target relative to a vehicle and a relative position of the second target relative to the vehicle;
   a lateral position estimation unit configured to estimate a lateral position of the vehicle and a direction of the vehicle based on the relative position of the first target relative to the vehicle and the position information on the first target on the map, the lateral position of the vehicle being a position of the vehicle on the map in a width direction of a traveling lane on which the vehicle travels; and
   a longitudinal position estimation unit configured to estimate a longitudinal position of the vehicle based on the relative position of the second target relative to the vehicle and the position information on the second target on the map, the relative position of the second target relative to the vehicle reflecting the lateral position of the vehicle and the direction of the vehicle, the longitudinal position of the vehicle being a position of the vehicle on the map in an extending direction of the traveling lane.

2. The vehicle localization device according to claim 1, wherein
   in the target database, the first target includes a straight marking line corresponding to a straight road section and the second target includes at least one curved marking line corresponding to a curve of a road,
   the target recognition unit is configured to recognize, based on the detection result of the in-vehicle sensor, a relative position of the straight marking line relative to the vehicle and a relative position of the at least one curved marking line relative to the vehicle,
   the lateral position estimation unit is configured to estimate, based on the relative position of the straight marking line relative to the vehicle and position information on the straight marking line on the map, the lateral position of the vehicle and the direction of the vehicle, and
   the longitudinal position estimation unit is configured to estimate the longitudinal position of the vehicle based on the relative position of the at least one curved marking line relative to the vehicle and position information on the at least one curved marking line on the map, the relative position of the at least one curved marking line relative to the vehicle reflecting the lateral position of the vehicle and the direction of the vehicle.

3. The vehicle localization device according to claim 2, further comprising an enlargement ratio calculation unit configured to calculate an enlargement ratio of a curve width, when the target recognition unit detects (i) a relative position of a left-side curved marking line corresponding to a curve in the traveling lane and (ii) a relative position of a right-side curved marking line corresponding to the curve in the traveling lane, the left-side curved marking line being included in the at least one curved marking line, the right-side curved marking line being included in the at least one curved marking line, wherein
   the longitudinal position estimation unit is configured not to compare a relative position of a part included in the left-side curved marking line or the right-side curved marking line, the part having the enlargement ratio equal to or higher than a predetermined enlargement ratio threshold, with the position information on the at least one curved marking line on the map.

4. The vehicle localization device according to claim 3, wherein
   the enlargement ratio calculation unit is configured to calculate a ratio of enlargement of a distance between the left-side curved marking line and the right-side curved marking line to a width of a straight road section of the traveling lane as the enlargement ratio of the curve width.

5. The vehicle localization device according to claim 1, wherein
   in the target database, the second target includes a branch marking line corresponding to a branch path, and
   the longitudinal position estimation unit is configured to estimate the longitudinal position of the vehicle based on a relative position of the branch marking line relative to the vehicle and position information on the branch marking line on the map, the relative position of the branch marking line relative to the vehicle reflecting the lateral position of the vehicle and the direction of the vehicle.

6. A vehicle localization device comprising:
   a target database that stores position information on a first target on a map and position information on a second target on the map; and
   an electronic control unit configured to
     recognize, based on a detection result of an in-vehicle sensor of the vehicle, a relative position of the first target relative to a vehicle and a relative position of the second target relative to the vehicle,
     estimate a lateral position of the vehicle and a direction of the vehicle based on the relative position of the first target relative to the vehicle and the position information on the first target on the map, the lateral position of the vehicle being a position of the vehicle on the map in a width direction of a traveling lane on which the vehicle travels, and
     estimate a longitudinal position of the vehicle based on the relative position of the second target relative to the vehicle and the position information on the second target on the map, the relative position of the second target relative to the vehicle reflecting the lateral position of the vehicle and the direction of the vehicle, the longitudinal position of the vehicle being a position of the vehicle on the map in an extending direction of the traveling lane.

* * * * *